L. E. HOWARD.
FLUID PRESSURE HAMMER.
APPLICATION FILED JULY 12, 1906.
931,609.
Patented Aug. 17, 1909.
7 SHEETS—SHEET 2.
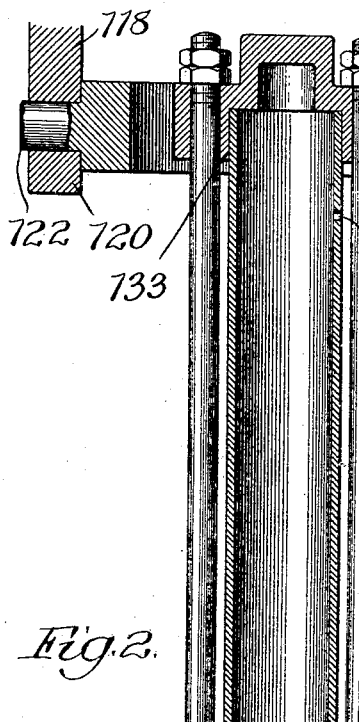
Fig.2.
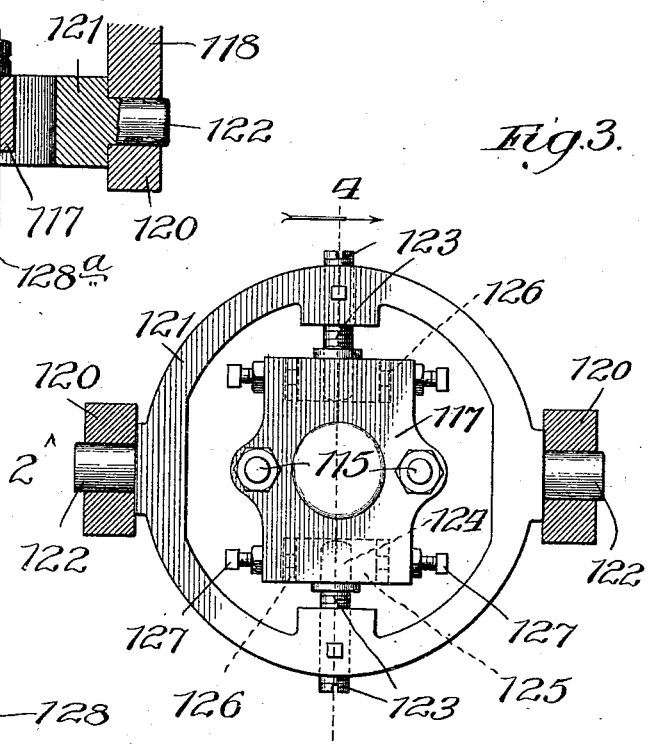
Fig.3.
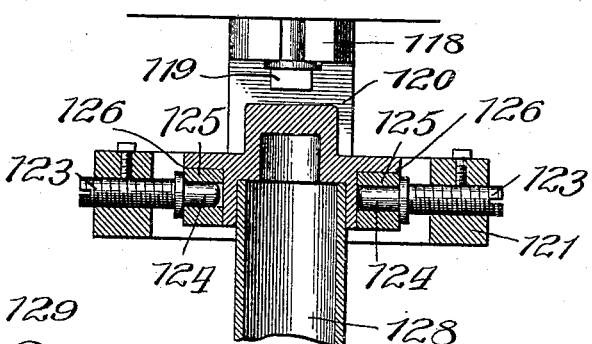
Fig.4.
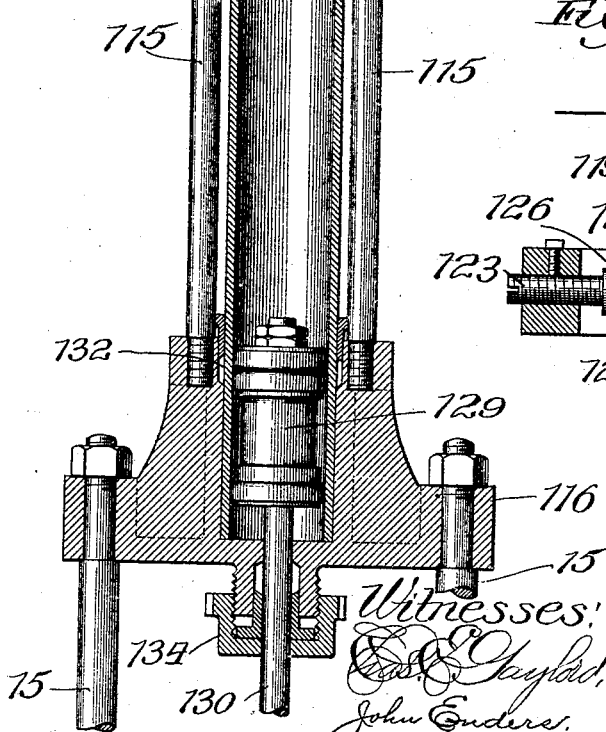
Witnesses:
Inventor:
Leslie E. Howard,
By Henry N. Carter
Atty.

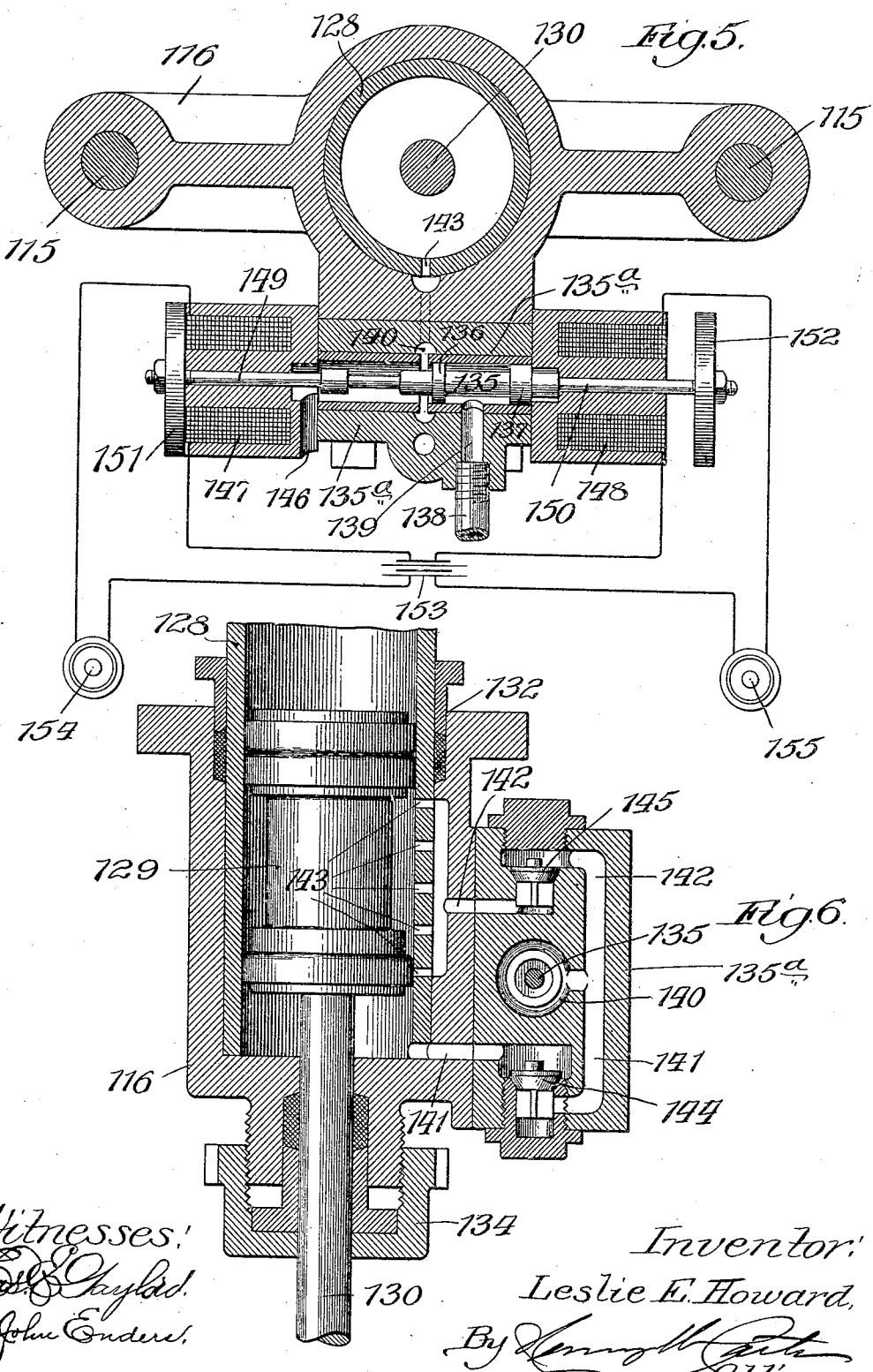

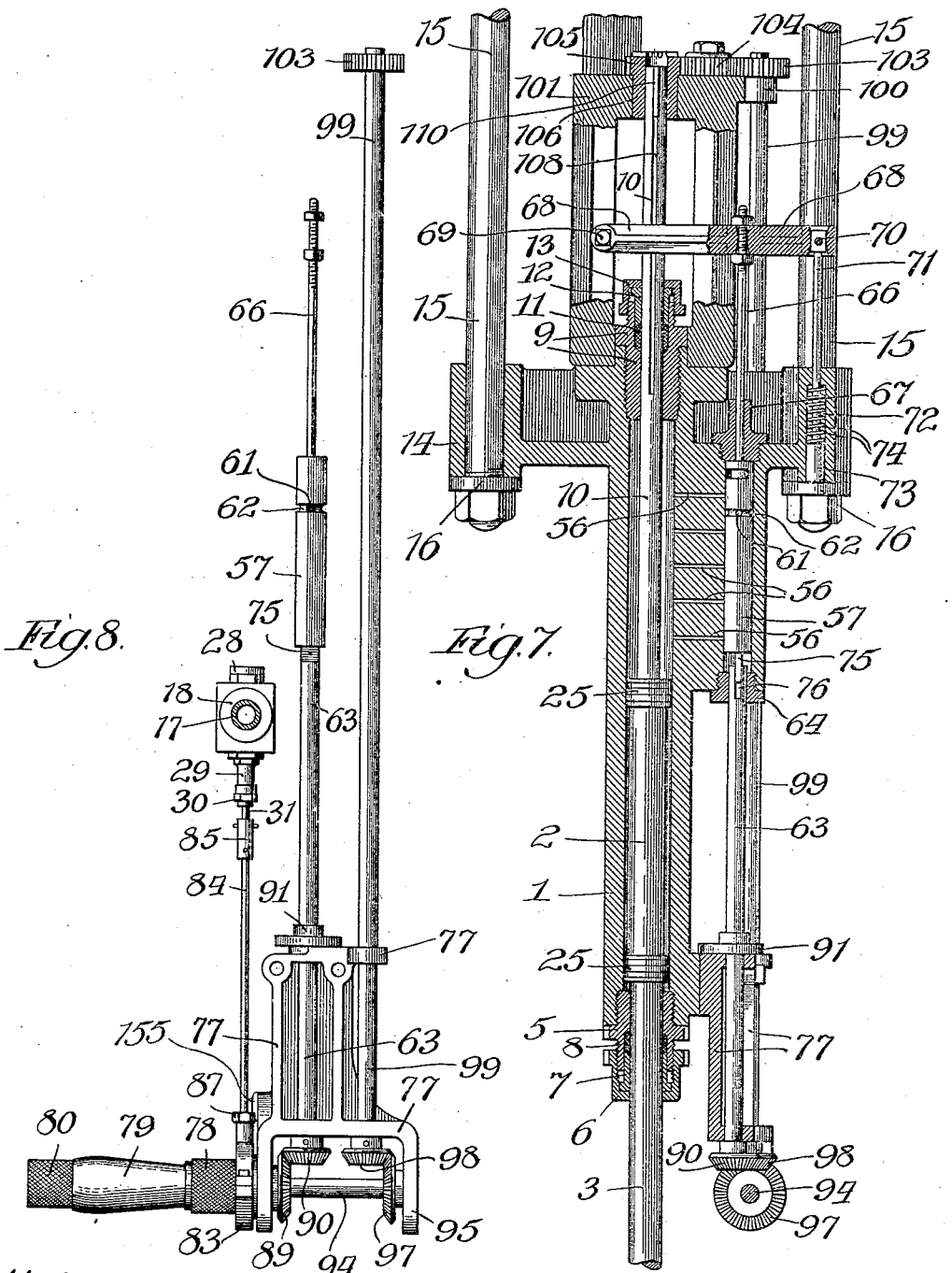

L. E. HOWARD.
FLUID PRESSURE HAMMER.
APPLICATION FILED JULY 12, 1906.

931,609.

Patented Aug. 17, 1909.
7 SHEETS—SHEET 5.

Witnesses:
Inventor:
Leslie E. Howard,
By
Atty

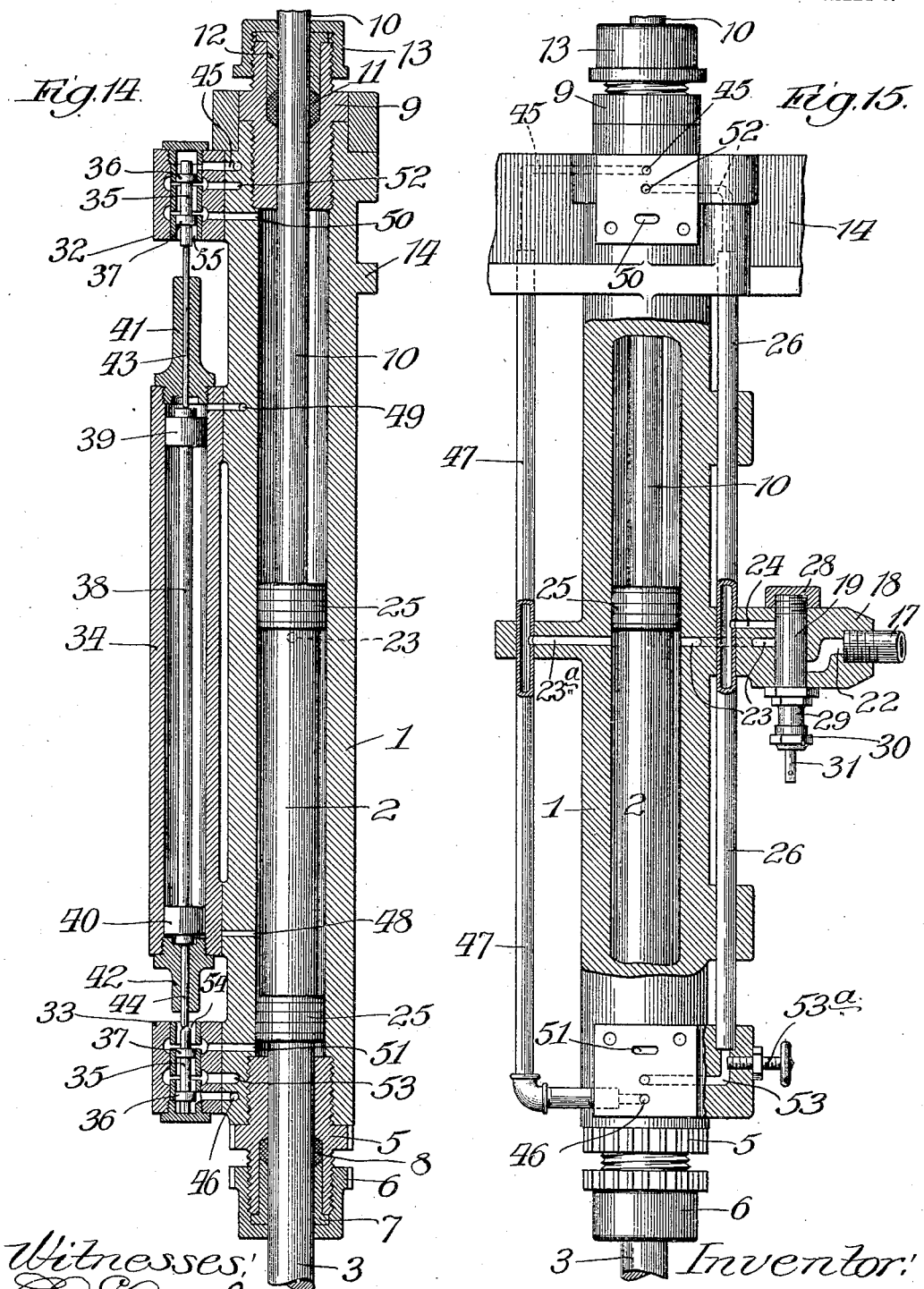

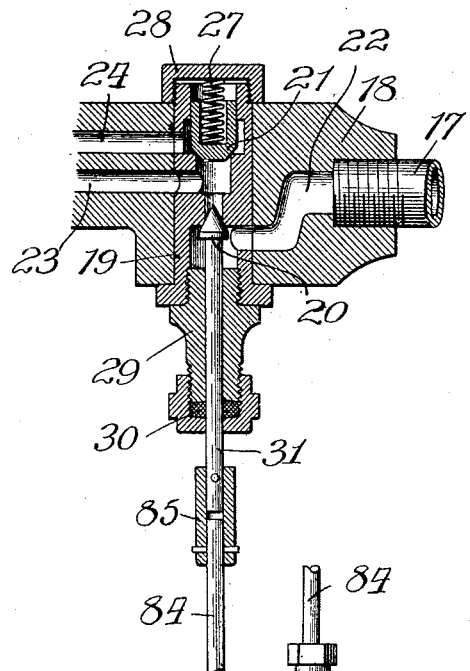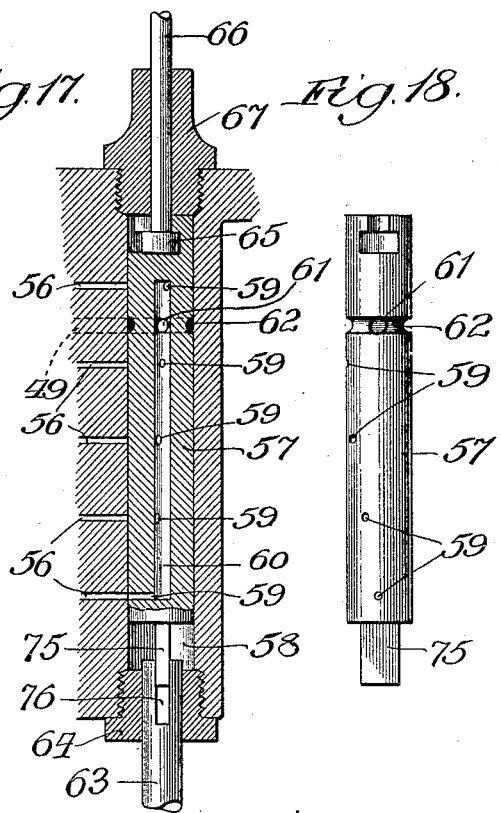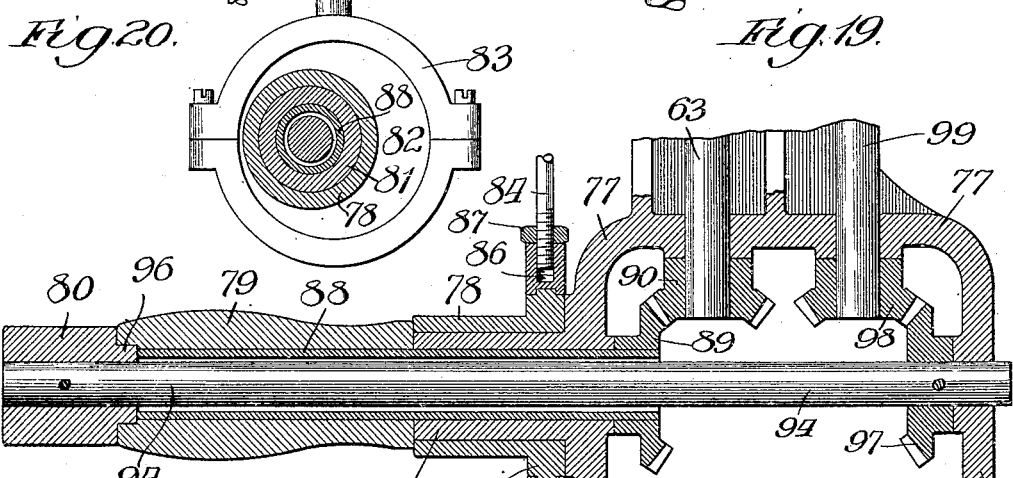

UNITED STATES PATENT OFFICE.

LESLIE E. HOWARD, OF LA GRANGE, ILLINOIS, ASSIGNOR TO SIMONDS MANUFACTURING COMPANY, OF FITCHBURG, MASSACHUSETTS, A CORPORATION OF MASSACHUSETTS.

FLUID-PRESSURE HAMMER.

No. 931,609.  Specification of Letters Patent.  Patented Aug. 17, 1909.

Application filed July 12, 1906.  Serial No. 325,787.

*To all whom it may concern:*

Be it known that I, LESLIE E. HOWARD, a citizen of the United States, and a resident of La Grange, in the county of Cook and State of Illinois, have invented certain new and useful Improvements in Fluid-Pressure Hammers, of which the following is a specification.

This invention relates to improvements in fluid pressure hammers and is more particularly directed to the production of a power hammer of this character capable of being successfully used in the hammering and tensioning of saws and similar sheet metal tools, although many of its features of improvement may be advantageously employed in other connections and in mechanisms designed for a different specific character of work.

The invention consists of the matters hereinafter set forth and particularly pointed out in the appended claims and will be fully understood from the construction illustrated in the accompanying drawings, in which—

Figure 1:
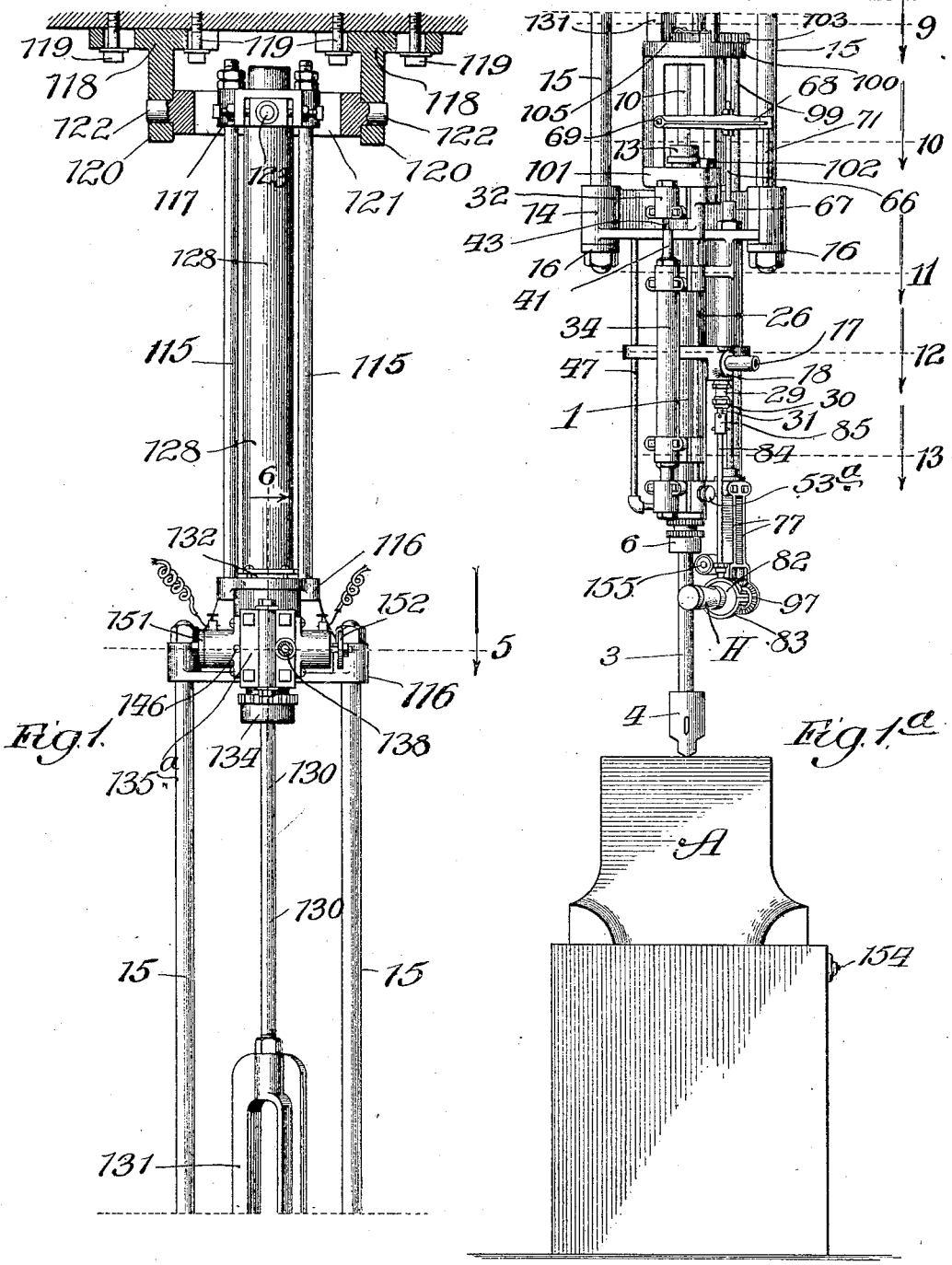

Figures 1 and 1ª are portions of the same general view in side elevation of a fluid pressure hammer constructed in accordance with my invention, Fig. 1 showing the upper portion of the machine device, and Fig. 1ª the lower. Fig. 2 is an enlarged sectional elevation of the hoisting device which is built into the upper part of the machine to enable the hammer proper to be raised clear of the anvil. Fig. 3 is a top plan view showing more particularly the construction of the universal joint by which the machine is swung from its upper end in such manner as to enable its hammer peen to be easily directed toward any desired part of the anvil. Fig. 4 is a transverse vertical section of the universal joint, taken on line 4 of Fig. 3. Fig. 5 is an enlarged top plan section more particularly showing the valve mechanism for operating the hoist portion of the machine, the section being taken on line 5 of Fig. 1. Fig. 6 is a similar transverse sectional detail taken on line 6 of Fig. 1. Fig. 7 is an enlarged sectional elevation of the hammer proper showing the selective valve device for controlling the length of stroke of the hammer. Fig. 8 is a similarly enlarged side elevation showing the handle connections for controlling the throttle valve, the selective valve, and the axial adjustment of the hammer peen. Figs. 9, 10, 11, 12 and 13 are sectional details taken on lines 9, 10, 11, 12 and 13 of Fig. 1ª. Figs. 14 and 15 are enlarged vertical sections of the automatic valve mechanism for giving reciprocating movement to the hammer, Fig. 15 being somewhat diagrammatic in character. Fig. 16 is an enlarged sectional detail of the throttle valve. Fig. 17 is an enlarged sectional detail of the selective valve. Fig. 18 is an enlarged side elevation of the selective valve piston alone. Fig. 19 is an enlarged sectional detail of the controlling handle and immediate connections. Fig. 20 is a sectional detail taken on line 20 of Fig. 19.

The machine thus illustrated as one embodiment of the present invention, is a hammer mechanism adapted to be worked by fluid pressure, preferably compressed air, and movably mounted above an anvil A on which the saw or other article to be hammered is placed. Such hammer mechanism includes a fluid pressure hammer proper, suspension devices by which the hammer is hung from an overhead support, so that the hammer peen can be effectively directed toward any point on the anvil, and hoisting devices for raising the hammer bodily above the anvil so as to leave the latter free for the placing and removal of work, or for other uses and operations, all of these devices being combined in the single concrete mechanism shown.

*The hammer proper.*—The hammer proper of the machine is more particularly shown in Figs. 7–20, in which 1 designates the hammer cylinder, and 2 the hammer piston which reciprocates within the cylinder and has an attached piston rod 3 which projects out through the lower end of the cylinder to carry the hammer head or peen 4. The lower end of the cylinder is herein shown as otherwise closed by a screw head 5 provided with a screw cap 6 and inclosing a gland 7 so as to form a stuffing box within which a packing 8 is placed to prevent leakage around the piston rod at its point of egress. The upper end of the cylinder 1 is also herein shown as closed by a screw head 9 which is bored out to permit the passage of a controlling rod or stem 10 that projects from the upper end of the hammer piston 2 and enables the hammer peen to be twisted axially while the hammer is at work, after a manner which will hereinafter more fully appear. The upper end of this screw head 9 is recessed to form a stuffing box within which a packing 11 is compressed by a gland 12 and inclosing screw cap 13 so as to prevent leakage around the stem 10. The upper end of the cylinder 1 is cast with a yoke 14, the ends of which are bored out to fit over side rods 15 that form part of the suspension for the hammer, as will hereinafter more fully appear. In the normal operation of the hammer, the yoke 14 will occupy the lower ends of the rods 15 and rest upon shoulders formed by the terminal nuts and washers 16 of said rods.

*The hammer valve mechanism.*—The valve mechanism for controlling the admission of air to and its exhaustion from the hammer cylinder 1, is herein shown as comprising three submechanisms—first, a throttle and reducing valve (Figs. 15 and 16) for initially controlling the admission of the air which operates the hammer — second, an automatic valve mechanism (Fig. 14) by which the admitted air is made to give reciprocating motion to the hammer — and third, a selective valve mechanism (Figs. 7, 17 and 18), by which the admission of air to the automatic valve is so controlled as to vary the length of stroke of the hammer, this selective valve being herein shown as constructed so that it may also be used as a throttle valve when found convenient.

*The throttle and reducing valve.*—Air is supplied to the hammer proper through a flexible hose 17, or other suitable connection, which leads into a lug or boss 18 cast on one side of the cylinder about midway of its length (Fig. 15). This boss is bored out to receive a cylindric plug 19 which incloses a needle valve 20 and a spring pressed reducing valve 21. The needle valve 20 forms the main throttle valve of the hammer. The function of the reducing valve will presently appear. These valves 20 and 21 are not necessarily mounted in proximity to each other, but the placing of both within the plug 19 is a desirable feature of practical construction which renders them readily accessible for inspection or repairs. A port 22 leads from the flexible hose 17 into the plug 19 beneath the needle valve 20, while two ports 23 and 24 lead from the upper side of the needle valve into the cylinder, the port 24 being guarded by the reducing valve 22. The port 23 leads directly into the interior of the cylinder 1 at a point about midway of the length of the cylinder (Fig. 15) and admits air to the annular space between the heads 25 of the hammer piston 2. This piston is made of spool shape and of such length that neither of its heads ever passes or covers the port 23, and said annular space between the piston heads is thus always filled with air at throttle pressure when the needle valve 20 is open. The air thus admitted to the space between the piston heads through the port 23 is used to actuate the automatic valve, but its pressure on the hammer is balanced so that it does not directly affect the movement of the latter. The air which actually operates the hammer is that which flows past the reducing valve 21 into the port 24, which port leads into a supply pipe 26 that distributes it to the upper and lower ends of the cylinder (Fig. 15). The action of the reducing valve is governed by a spring 27 that is held compressed by a screw cap 28, and by substituting springs of different weights for the spring 27, the proportionate reduction in the pressure of the operating air as compared with the throttle pressure may be made greater or less as desired. Ordinarily, however, the amount of reduction will be very small—only a few per cent. of the full pressure admitted at the throttle. The screw cap 28, which compresses the spring 27, is also herein shown as utilized to clamp the valve plug 19 in place, and the lower end of this plug is shown as provided with a screw head 29 terminating in a stuffing box 30 through which the stem 31 of the needle or throttle valve passes to engage its controlling connections, hereinafter described.

*The automatic valve.* — The automatic valve mechanism for causing the air admitted at the throttle valve to reciprocate the hammer piston, is more particularly illustrated in Fig. 14, and is shown as comprising three separate parts including upper and lower valve chests 32 and 33, respectively, and an intermediate valve cylinder 34, all bored out in alinement with each other. The valve chests 32 and 33 each contain a small piston valve 35 made of spool shape or with heads 36 and 37 which are connected by a portion of reduced diameter. The intermediate valve cylinder 34 also contains a spool shape piston 38 having heads 39 and 40 which are connected by a portion of reduced diameter. The ends of this valve cylinder 34 are closed by screw heads 41 and 42 that are bored out to permit the passage of sliding stems 43 and 44, the inner ends of which contact with the extremities of the inclosed piston 38 while their outer ends contact with the adjacent valve pistons 35 that occupy the valve chests 32 and 33 respectively. All of these several valves and stems are maintained under an elastic or yielding endwise pressure which normally keeps them pressed toward and in contact with each other. Such yielding pressure is, in this instance, an air pressure, supplied to the upper and lower ends of the valve chests 32 and 33 through ports 45 and 46 leading from a pressure pipe 47 that is maintained in communication with the interior of the hammer cylinder 1 through a port 23ª which may be regarded as (in effect) a continuation of the port 23 that leads from the throttle valve. This air maintains the upper and lower ends of the valve chests 32 and 33, respectively, under full throttle pressure acting in opposite directions to yieldingly press the valves toward each other and against the intermediate members formed by the piston 38 and stems 43 and 44. The pressure thus admitted to the valve chests, however, is exactly balanced, and the two valves have no tendency to move in either direction, except as pressure may be admitted to the intermediate cylinder 34 to actuate the piston 38. This admission of pressure to and its exhaustion from the intermediate valve cylinder 34 is accomplished at the lower end of the cylinder through a port 48 which opens through from the hammer cylinder 1 at a point a short distance above the bottom of the latter, while at the upper end of said cylinder 34 it is accomplished through a port 49 which leads from the hammer cylinder through the selective valve presently to be described.

When the air enters the lower end of the cylinder 34 through the port 48, it forces up the piston 38 and the upper piston valve 35, and permits the constant pressure in the lower end of the lower valve chest 33 (admitted from the pressure pipe 47), to force up the lower valve 35, and this action is about to take place with the parts in the position shown in Fig. 14. On the other hand, when air is admitted to the upper end of the cylinder 34, through the port 49, it forces down the piston 38 and the lower piston valve 35, and permits the constant pressure in the upper end of the upper valve chest 32 (admitted from the pressure pipe 47) to push down the upper valve 35. The position of the parts shown in Fig. 14 is that occupied at the completion of this downward movement and just before the upward movement takes place. These movements of the upper valve 35 carry the lower head 37 of this valve past a port 50, which leads from the upper valve chest 32 into the extreme upper end of the hammer cylinder 1 and constitutes the main inlet and exhaust port for the cylinder at its upper end. Just so the similar movements of the lower valve 35, carries the upper head 37 of this valve past a port 51 which leads from the lower valve chest 33 into the extreme lower end of the hammer cylinder and constitutes the main inlet and exhaust port of said cylinder at its lower end. Said valve chests 32 and 33 are also provided, at a point between their ends, with inlet ports 52 and 53, respectively, which communicate with the supply pipe 26. The mouths of these ports 52 and 53 are never closed by the valve movement, and the annular space within the valve chests between the heads 36 and 37 of their valves, is consequently at all times filled with air under pressure admitted from the throttle valve through the reducing valve and supply pipe. Consequently, when the upper valve 35 is permitted by the piston 38 to descend, the air from the supply pipe flows from the valve chest through the port 50 into the upper end of the main cylinder 1 and forces the hammer piston down, while when the valve 35 in the lower valve chest 33 is permitted to move upward by the intermediate valve piston 38, air from the supply pipe flows through the port 51 into the lower end of the main cylinder 1 and lifts the hammer piston. As shown in Fig. 14, the air is still being admitted to the upper end of the main cylinder through the port 50, but the downward stroke of the hammer has just been completed and is about to be reversed by the upward movement of the intermediate valve piston 38. During the downward stroke the air in the lower end of the hammer cylinder will exhaust through the port 51 and through an exhaust port 54 that in this instance is formed by the bore of the valve chest which is left open at its upper end for the purpose. In like manner, when the hammer piston is lifted the air in the upper end of the hammer cylinder will exhaust through the port 50 and through an exhaust port 55, shown as formed by the bore of the valve chest 32 which is left open at its lower end. The air which actually operates the hammer and which enters the hammer cylinder through the ports 50 and 51 is thus all taken from the supply pipe 26, to enter which it must pass through the port 24 from the reducing valve 21. On the other hand the air that enters the cylinder 34 to operate the intermediate valve piston 38 is all taken from the annular space between the heads of the hammer piston which is supplied through the port 23 directly from the throttle valve and without reduction of pressure. This air, of course, begins to enter the port 48 before the hammer piston reaches its extreme lowermost position, shown in Fig. 14, but owing to the rapidity of the movement the hammer completes its downward stroke before the intermediate valve piston 38 rises far enough to permit any live air to enter the lower end of the hammer cylinder or to even cut off the exhaust therefrom through the port 51, and as a consequence the downward stroke of the hammer is not cushioned in any way but delivers its full blow upon the anvil, the presence of the anvil being relied upon to protect the lower cylinder head from the blow.

*The selective valve.*—The selective valve is a mechanism designed to vary the lift of the hammer and consequently the strength of the blow which the hammer delivers to the work on the anvil, and is illustrated in detail in Figs. 7, 17 and 18. It includes a series of ports 56 which lead out of the hammer cylinder 1 at different points along the upper portion and either one of which may be thrown into communication with the port 49 (which leads to the upper end of the intermediate valve cylinder 34), through the action of a rotary valve plug 57. This plug is seated in a bore 58 formed in an enlargement of the wall of the cylinder 1 near the upper end thereof, as shown in Fig. 7, and is provided with a number of ports 59 which are spaced apart vertically exactly as the ports 56 are, but which are arranged at different radial angles or have their outer ends otherwise so located with respect to the ports 56 that only one at a time can register with one of these ports 56. The ports 59 all lead inwardly to a longitudinal channel 60 in the plug 57, which channel is itself kept in constant communication, normally, with the port 49 through one or more radial ports 61 in said plug and through a communicating annular groove 62 which is cut in the outer surface of the plug 57 at the level of the port 49. The valve plug 57 is arranged to be turned axially by a valve stem 63 that enters the bore 58 through a screw head 64 by which the bore is closed at its lower end. And it can thus be rotated so as to bring any one of the ports 56 into communication with the port 49, and thereby cause the latter port (in effect) to lead out of the hammer cylinder at any one of the several points along its upper length where the ports 56 are provided. Then in the upward movement of the hammer piston, air under full throttle pressure will be admitted through the port 49 to the upper end of the intermediate valve cylinder 34, as soon as the upper head 25 of the hammer piston passes that one of the ports 56 with which the port 49 is at that moment in communication, and thereupon the intermediate valve piston 38 will be forced down and will force down the lower piston valve 35, thus causing it to cut off the air supply from the port 51 (through which it will have been entering the lower end of the cylinder to raise the hammer), and throw this port into communication with the exhaust port 54. At the same time the constant pressure in the upper end of the upper valve chest 32 will force the upper piston valve 35 down (as the intermediate valve piston descends), and cause it to cut off the port 50 from communication with the exhaust port 55 and throw it into communication with the port 52 leading from the supply pipe 26. And thereupon the operating air admitted through the reduction valve will at once enter the upper end of the cylinder and reverse the movement of the hammer by forcing its piston downward. The timing of this reversal will thus obviously depend directly upon which one of the ports 56 is, for the time being, acting as the channel of communication between the hammer cylinder and the port 49. If this port 56 is one of the lower ports of the series it will be more quickly reached by the upper head 25 of the piston, and uncovered for the entrance of the air by which the automatic valve is shifted to reverse the admission of the operating air to the cylinder, and in this case the stroke of the hammer will be shorter. On the other hand, if this port 56 is one of the upper ports of the series, the admission of air through it to the automatic valve will take place later in the lifting movement of the piston, with a corresponding delay in the reversal of the movement and a corresponding increase in the length of the stroke of the hammer. The number of different lengths of hammer stroke provided for will, of course, equal the number of the ports 56 provided, and as herein shown, there are five of them, spaced at intervals along the upper length of the bore of the cylinder (Figs. 7 and 17). Obviously, however, any greater or less number of these ports may be provided as desired, it being only necessary that the valve plug 57 shall have a corresponding number of ports 59, correspondingly located.

*Number of strokes per minute.*—To enable the rapidity with which the hammer strokes follow each other to be varied so as to provide for any desired number of strokes per minute, an adjusting valve 53$^a$ (Fig. 15) is applied to the port 53 which leads from the supply pipe 26 into the valve chest 33 at the lower end of the cylinder. By screwing in this valve the supply of air beneath the hammer piston can be choked down so that it will lift the hammer either more or less rapidly, as desired, and this without affecting the weight or force of each blow delivered by the hammer. For these will remain constant, regardless of the number of strokes per minute, so long as the pressure of air admitted at the throttle is constant and the length of stroke determined by the selective valve remains unchanged. In other words, the character of the hammer blow is determined by the adjustments of the throttle and selective valves, while the number of strokes per minute is determined by the valve 53$^a$ without affecting their character.

*The function of the reducing valve.*—It being desirable to permit the selective valve to be also utilized at times as a shut off valve for stopping the hammer without necessitating the closing of the throttle valve 20, the selective valve plug 57 is further arranged to be turned into one or more extreme positions in which none of the pairs of co-acting ports 56—59 register with each. In these positions the port 49 will be entirely cut off, and the action of the automatic valve, and consequently of the hammer, will at once stop, but may instantly be started again by turning back the selective valve to bring one of its ports 59 into register with the coöperating port 56. And it is when the hammer is thus brought into action again by the turning back of the selective valve, that the usefulness of the reducing valve 21 becomes apparent. For when the port 49 is cut off from communication with the hammer cylinder, either by such extreme turning of the selective valve plug, or by a longitudinal movement of the plug presently to be referred to, the automatic valve will stop at the upper limit of its movement, and thus in turn stop the hammer at the upper end of its stroke, both the hammer piston 2 and the intermediate valve piston 38 being thus held up by the air from the supply pipe 26, which enters the lower end of the hammer cylinder through the ports 51—53 and passes thence into the lower end of the intermediate valve cylinder through the port 48. The pressure of air beneath the valve piston 38 will then immediately equalize to the pressure in the supply pipe 26, and consequently unless the pressure in this pipe is maintained at a somewhat lower point than the full throttle pressure (which is admitted above the valve piston 38 through the port 49 when the selective valve is moved back), there will be no preponderance of pressure to force said valve piston 38 down and start the hammer into action once more. Such preponderance of pressure is, however, brought about in the construction described by the reducing valve 21 which always keeps the pressure in the supply pipe 26 somewhat lower than the full throttle pressure, and thus enables this latter pressure, when admitted above the valve piston 38, to overcome the supply pipe pressure beneath said valve piston and start the automatic action once more. When the automatic action is once started, a sufficient preponderance of pressure on the top of the automatic valve piston 38 will arise from the fact that the air in the bottom of the hammer cylinder will necessarily have its pressure drawn down somewhat below full throttle pressure by reason of the upward movement of the piston which is being lifted by this air, so that when once started, the hammer would operate even though the reducing valve were removed. And the starting itself might be accomplished without the reducing valve in a number of ways, as by taking hold of the valve stem 43, where it projects out of the screw head 41, and pressing it downward upon the piston 38 which will be readily movable, owing to the fact that the pressures upon it will be temporarily balanced. Or by shutting off the air at the throttle and permitting the hammer to descend by gravity, and then opening the throttle again. But these methods involve delays in operation which, although slight, are not negligible in practice, and are entirely done away with by the introduction of the reducing valve.

*Automatic shut-off.*— The selective valve 57 is also utilized as an automatic shut-off valve for stopping the hammer when the hammer mechanism proper is lifted by the hoisting devices hereinafter described. To this end it is made capable of longitudinal as well as rotary movement within its inclosing bore 58, and has a swivel connection at its upper end with the enlarged head 65 of a rod or stem 66 that passes out of the top of the bore through a screw head 67 which closes the bore at its upper end. This stem 66 is connected with a lever 68 (Fig. 7) which is pivoted at one end 69 to a casting secured to the top of the hammer cylinder. At its other end 70 this lever 68 is connected to the upper end of a sliding rod 71 which extends down into a socket 72 that is bored in one of the ends of the yoke 14. This socket opens out at the under side of the yoke, and the rod 71 is provided with a head 73 adapted to slide in and out of this socket and to be held normally projected by a spring 74 placed in the socket above said head. When the hammer is lowered so that the yoke 14 rests upon the shoulders formed by the nuts and washers 16, the head of the rod 71 is forced up into the socket 72, and the resulting position of the lever 68 and stem 66 is such as to maintain the valve plug 57 at the proper height to permit of registration between the ports 56 and 59. When, however, the yoke 14 begins to slide up on the rods 15, as the hammer is lifted by the hoisting devices, the rod 71 will be drawn down by the action of the spring 74 on the head 73 of the rod, and this in turn will act through the lever 68 and stem 66 to force the selective valve plug 57 down in its bore 58 until the ports 56 and 59 are so far out of register that all possibility of communication between them is prevented and the hammer is stopped by the cutting off of the port 49 from communication with the hammer cylinder. The rotary adjustment of the selective plug can take place notwithstanding its connection with the lifting stem 66 by reason of the swivel joint provided between the valve plug and this stem, and to permit of the longitudinal movement of the plug without interfering with its connection with the stem 63 by which its rotary adjustment is accomplished, a sliding connection is provided between these parts. This connection is formed, as herein shown, by a flattened projection 75 which depends from the lower end of the valve plug 57 and fits slidably within a flat slot 76 in the upper end of the stem 63 (Fig. 17), thus permitting relative longitudinal movement between the parts while holding them against relative rotary movement.

*The single operating handle.*—The connections by which the throttle and selective valves are operated, and the hoisting devices controlled and which enable the hammer peen to be twisted axially at any time and whether the hammer is at work or is idle, all lead, in this improvement, to a single handle device H, which also serves as a handle for swinging the machine as a whole about its point of overhead suspension, so as to bring the hammer peen over any desired point on the anvil. The general location of this handle with respect to the other parts of the machine, is shown in Fig. 1ª, but the details of the construction of the handle connections are brought out in Figs. 7, 8, 19 and 20. The supporting bracket 77 for the handle H is shown as bolted or otherwise rigidly secured to the lower end of the cylinder, and has mounted upon it three adjacent rotary sections 78, 79 and 80, which, as a whole, make up the single handle for swinging the machine, but which are individually capable of separate rotary adjustment. Of these the inner section 78 forms the handle for operating the throttle, the middle section 79 forms the handle for operating the selective valve to determine the length of the stroke of the hammer or to stop it altogether, and the outer section 80 forms the handle for turning or giving axial rotation to the hammer peen when desired. A controlling switch for the hoisting mechanism is also provided on the bracket 77 as a part of the handle device and in such relation to the handles 78, 79, 80, as to enable the switch to be operated by the thumb or a finger of the hand which grasps the handle, without releasing the grip upon the latter.

*Handle connections to throttle.*—The throttle valve section 78 consists of a short cylindric sleeve mounted to turn upon a projecting boss 81 of the handle bracket 77. At its inner end this sleeve 78 is provided with an eccentric 82 that turns within the usual eccentric strap 83, from which a pitman 84 leads upward to the throttle valve stem 31, and is joined thereto by any suitable coupling 85. By rotating the sleeve 78 longitudinal movement will be imparted to the valve stem 31 by which the throttle valve 20 will be closed or opened as desired, or opened to any desired extent. Adjustment of this connection is provided for by screwing the lower end of the pitman 84 into a socket 86 of the eccentric strap, a jam nut 87 being provided to lock the parts together in any desired position of adjustment.

Figure 13:
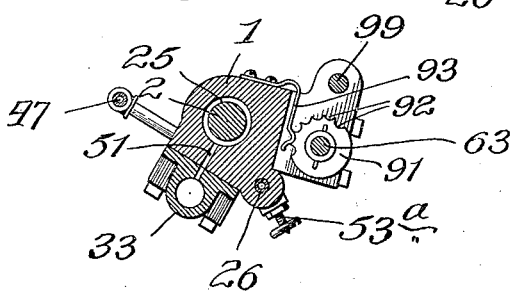

*Handle connections to selective valve.*—The intermediate or selective valve section 79 of the handle is made fast to the outer end of a sleeve 88 which is journaled within the boss 81, upon which the throttle section 78 is mounted. At its inner end, this sleeve 88 carries a rigidly attached beveled gear 89 which intermeshes with a bevel pinion 90 that is rigidly mounted on the lower end of the selective valve stem 63, this stem being journaled to rotate in the handle bracket 77 (Figs. 7 and 8). By turning the section 79 rotary movement to any desired extent can thus be imparted to the selective valve plug 57, and any pair of the ports 56—59 brought into register with each other or the plug turned to an extreme position by which the action of the hammer will be stopped, as heretofore explained. And to enable the proper points of rotary adjustment to be readily determined, the stem 63 is shown as provided, just above the handle bracket (Fig. 7), with a rigidly attached flanged collar 91 having a series of notches 92 in its periphery adapted to be engaged by a spring pawl 93 on the handle bracket (Fig. 13). One such notch 92 will be provided for each coöperating pair of ports 56—59, and will be so located on the periphery of the flange 91 as to be engaged by a spring pawl 93 when the members of this pair of ports are in register with each other. And this requires that the number of notches 92 thus provided shall equal the number of pairs of ports 56—59 plus an additional notch at each end of the series to correspond with the extreme turning movements of the selective valve. That is to say, where five pairs of ports 56—59 are provided, as in the present instance, seven notches in the collar 91 are called for, of which the middle five notches correspond to the various working positions of the selective valve, while the end notches correspond to its extreme positions, in which the operations of the hammer are cut off by the closing, in effect, of the port 49.

Figure 9:
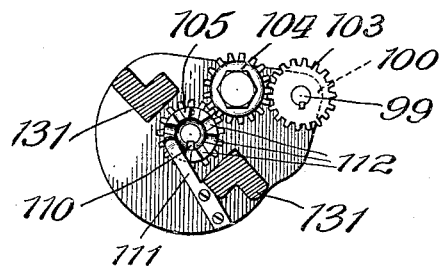
Figure 10:
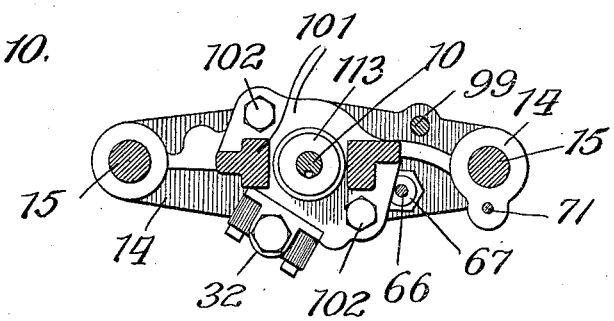
Figure 11:
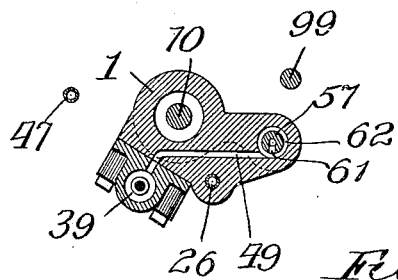
Figure 12:
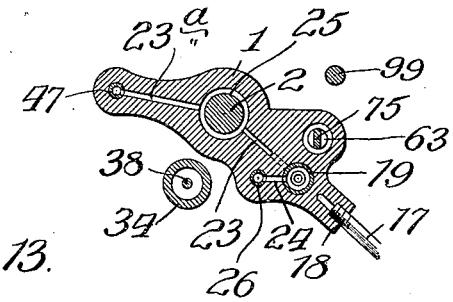

*Handle connections for adjusting peen.*— The outer section 80 of the handle, which by its rotation serves to give axial rotation and adjustment to the hammer peen, is rigidly secured to the outer end of a shaft 94, of which the opposite end is journaled within a depending flange 95 of the handle bracket, said shaft 94 being extended through the sleeve 88 of the handle section 79, and being supported at its outer end by a circular boss 96 which is seated in a counterbore in said section 79 so as to turn therein. The inner end of the shaft 94 carries a rigidly attached beveled gear 97 which intermeshes with a beveled pinion 98 that is rigidly attached to the lower end of a vertical shaft 99. This shaft is also journaled in the handle bracket 77, parallel with the selective valve stem 63 (Fig. 8), and extends upwardly through a journal bearing formed in the corner 100 of a casting 101 that is screwed to the upper end of the hammer cylinder 1 by bolts 102 (Figs. 9 and 10). The upper end of this shaft 99 carries a rigidly attached spur gear 103 which intermeshes, through an intermediate or idler gear 104, with another spur gear 105 (Figs. 7 and 9). This latter gear is formed with a sleeve 106 by which it is journaled in the upper portion of the casting 101, and the sleeve and the gear are bored out for the loose reception of the upwardly projecting stem 10 of the hammer piston. This stem is provided with a longitudinal spline or key seat 108, and the gear 105 is provided with a key or feather 110 (Figs. 7 and 9) which slidably engages this key seat and causes the piston stem 10 to rotate with the gear 105 while permitting it to slide freely through said gear. Consequently by turning the outer handle section 80, the stem 10, together with the hammer piston 2, its piston rod 3, and the attached hammer peen 4, may be turned into any desired position of angular adjustment at any time, whether the hammer is being reciprocated or not. Any unintentional turning or maladjustment of the peen is at the same time prevented by a spring pawl 111, the extremity of which is adapted to engage any one of a series of notches 112 formed in the upper surface of the gear 105. (Fig. 9).

*The suspension devices.*—In order to permit the necessary movement of the hammer peen above the anvil, it is practically necessary to pivotally suspend the mechanism from a suitable overhead support, and to enable the required swing to take place without materially varying the essential vertical arrangement of the hammer, the suspension devices herein provided are made of relatively great length, and include a lower pair of suspension rods 15 (upon which the yoke 14 of the cylinder slides, as has been stated), and an upper pair of suspension rods 115, the lower ends of which are rigidly connected with the upper ends of the rods 15 by a yoke 116. These rods 115 serve to suspend the hammer mechanism from the middle member 117 of a universal joint which is adapted to be bolted directly to the ceiling or to some other overhead support. This universal joint, as herein shown, comprises a pair of brackets 118, that are adjustably secured to the ceiling (as by bolt and slot connections 119), and has depending arms 120 between which an annular member 121 is journaled on trunnions 122. Projecting inwardly from this annular member on an axis at right angles to the axis of the trunnions 122, are studs 123 which serve to pivotally support the middle member 117, and a double pivotal axis is thus provided which obviously serves to permit the hammer to be swung in any direction and so as to bring its peen above any desired point on the anvil. And in order to permit the center of gravity of the hammer mechanism to be adjusted beneath the center of suspension so that the hammer will normally hang straight down, the studs 123 are made in the form of screws, and their inner ends 124, instead of directly engaging the middle member 117 of the joint, project into bored sockets in bearing blocks 125, that are clamped within recesses 126 in said middle member by set screws 127 (Figs. 3 and 4). So that by adjusting the pivot screws 123 in the annular member 121, and by adjusting the blocks 125 in the recesses 126, the machine may be adjusted bodily in any direction with respect to the center of suspension, and so as to cause the axis of the hammer to normally assume a perfectly vertical position.

*Hoisting devices.*—The hoisting devices by which the hammer proper is lifted clear of the anvil when desired, are herein shown as comprising a vertical cylinder 128 containing a piston 129 which is connected with the hammer cylinder 1 by a piston rod 130 and attached yoke 131 (Figs. 1 and 2), so that when the piston 129 is forced up within the cylinder 128, the hammer mechanism will be lifted bodily—its yoke 14 sliding upwardly upon the rods 15 as guide rods during the lifting movement. The hoist cylinder 128 is located between the rods 115, and is clamped by these rods between the yoke 116 (which connects the suspension rods 15 and 115) and the middle member 117 of the universal joint, the lower end of the cylinder being seated within a stuffing box 132 in the upper face of said yoke 116, while its upper end is seated in a socket 133 in the lower face of the middle member 117. Said parts 116 and 117 thus form, in effect, the lower and upper heads of the hoist cylinder, and the piston rod 130 extends down through a stuffing box 134 in the yoke or head 116 to connect with the hammer, the yoke 131 which connects its lower end with the hammer forming an upward extension of the casting 101 heretofore described as supporting the gearing on the top of the hammer cylinder through which the peen is rotated.

*Valve mechanism for controlling hoist.*— The devices for controlling the operation of the hoist are shown in detail in Figs. 5 and 6 and comprise a valve for controlling the admission of fluid pressure to and its exhaustion from the hoist cylinder 128, and electromagnet devices for operating this valve. The valve shown is a horizontal piston valve 135 mounted in a valve chest 135ᵃ that is bolted to one side of the yoke 116 which forms the lower head of the hoist cylinder. This valve piston is made spool shaped and has its heads 136 and 137 connected by a body portion of reduced diameter, and the operating air is introduced to the valve from a flexible pipe or like connection 138 through a port 139 that leads into the bore of the valve chest at a point which is always between these heads 136 and 137. The valve chest is also provided with an annular port 140, across which the head 136 of the valve piston is made to reciprocate, and which is connected with the cylinder through separate ports 141 and 142. Of these the former constitutes the inlet port of the cylinder and leads into its extreme lower end, while the latter constitutes the exhaust port of the cylinder and leads out at a point several inches above its lower end—in fact at several points 143 distributed along the cylinder at varying distances above its lower end, as herein shown,—check valves 144 and 145 being located in the ports 141 and 142, respectively, to determine the course of the air in entering and leaving the cylinder.

The object of having separate inlet and exhaust ports and of locating the exhaust port several inches above the lower end of the cylinder is to cushion the piston 129 in its extreme downward movement, the extreme lower end of the cylinder below the exhaust port serving as a dashpot in which the air is compressed so as to yieldingly resist final downward movement of the piston. The object of having the exhaust port lead out through a number of openings 143 placed at different distances from the extreme lower end of the cylinder, is to secure a gradual closing of the exhaust by which the movement of the piston will be gradually brought to rest without the tendency to rebound which would be likely to result if a free exhaust were permitted up to the moment at which it was cut off entirely. By this arrangement the piston begins to slow down as soon as it passes the uppermost exhaust outlet 143 and is gradually slowed down more and more as the successive exhaust openings are cut off, until by the time it reaches the lower end or dashpot portion of the cylinder its motion will have been so checked that it will come to rest easily and gradually and without shock or jar to the machine, or any tendency to rebound.

The flow of air through the valve to and from the cylinder will be readily followed. When the piston valve 135 is moved to the right (as shown in Fig. 5), its head 136 cuts off the intake port 139 from the port 140 leading to the cylinder, and leaves this port 140 in communication with the outer air through an outlet opening 146 leading from the end of the valve chest bore. This permits the weight of the hammer mechanism to draw down the piston 129 and force the air previously admitted to the hoist cylinder out through the openings 143, port 142, annular port 140 and outlet 146, past the check valve 145 which opens to permit the air to thus escape, the check valve 144 being in the meantime held firmly seated by the air pressure so that no air can escape through the inlet port 141. When, on the other hand, the piston valve 135 is moved to the left (Fig. 5), the port 140 is cut off from communication with the outer air and is thrown into communication with the intake port 139, from which the compressed air immediately passes into the lower end of the cylinder through the ports 140 and 141 and check valve 144, the outer check valve 145 in the meantime seating itself so as to prevent any entrance of air to the cylinder through the exhaust port. The air thus admitted to the hoist cylinder forces up its piston 129 and lifts the hammer mechanism off the anvil and to the height permitted by the sliding of the yoke 14 upwardly on the rods 15, the air above the piston escaping during this movement through an exhaust port 128$^a$ provided in the cylinder 128 near its upper end. This exhaust port is located sufficiently below the extreme upper end of the cylinder to form a dashpot space above it within which the air will be compressed after the upper end of the piston 129 has passed the port 128$^a$, and thus serve to cushion the extreme lifting movement and bring the mechanism gradually to rest.

*Electromagnets for operating valve.*—The movement of the valve 135 to accomplish these different operations is herein shown as brought about by a pair of electromagnets 147 and 148, one of which is located at each end of the valve chest 135$^a$. Stems 149 and 150 project from each end of the piston valve 135 loosely through apertures in the cores of these magnets and carry at their ends soft iron armatures 151 and 152, which are attracted, respectively, by the electromagnets 147 and 148. These armatures are rigidly attached to the valve stems at a distance apart somewhat greater than the distance between the outer faces of the electromagnets, so that only one armature can be in contact with its magnet at a time. Then if one of the magnets is energized, its armature wil be attracted against its poles with sufficient force to move the valve in one direction, while, if the other magnet is energized, its armature in turn will be attracted with sufficient force to move the valve 135 in the opposite direction. Any suitable battery or source of electrical energy, diagrammatically indicated herein at 153, will serve to energize the magnets when the circuit is connected through push buttons or other equivalent switches 154 and 155, and since the action will take place instantly when the push button is pressed, only a very small quantity of current will be required for the operation. The push button 155 for causing the hammer mechanism to be lifted by the hoist is shown as located on the handle bracket 77 within convenient reach of a finger of the hand which grasps the handle. The other push button will desirably be located on the anvil or elsewhere in a position where it is readily accessible when the hammer mechanism is lifted.

*The operation of the hammer.*—The practical operation of the hammer thus described, will be as follows:—When out of use the hammer proper will be held up by the hoist so as to leave the anvil A entirely clear, the valve 135 of the hoist being to this end left in such position that the air pressure will be maintained beneath the piston 129. This will keep the piston at the upper end of the cylinder 128 and hold the hammer in its elevated position. When it is desired to use the hammer (a saw or other article to be hammered having been placed upon the anvil), the operator will press the button 154 (Fig. 5), thus closing the circuit through the magnet 147 and causing it to attract its armature 151. The armature 152 in the meantime will have been in contact with the magnet 148, but since the latter will not be energized it will have no holding power, and the attraction of the armature 151 by the magnet 147 will cause the valve 135 to move to the right, or into the position shown in Fig. 5. This will bring the head 136 of the valve between the ports 139 and 140 and cut off the live air from the port 141, which leads into the bottom of the hoist cylinder 128 beneath the piston 129, and the latter will thereupon descend under its weight and the weight of the attached mechanism of the hammer. The descent of the piston will take place freely through the greater portion of its downward movement, the exhaust taking place through the outlet opening 143, the port 142, and the check valve 145 in the latter, and through the port 140 and inner bore of the valve chest 135ᵃ to the exhaust port or opening 146 of the valve. But as the piston reaches the lower end of the cylinder, the outlets 143 will be cut off one by one, thus choking the exhaust and gradually slowing down the movement, until the piston enters the dashpot space provided in the lower end of the cylinder 128 beneath the lowermost port 143, whereupon its final descent will be cushioned by the air compressed into this dashpot, this air being retained by the action of the check valve 144 in the inlet port 141. The hammer mechanism being thus lowered, the operator will grasp the handle H (Figs. 1ᵃ, 8 and 19), and by turning the sleeve 78 will open the throttle valve 20 and start the hammer moving. As this valve is opened the air from the inlet pipe 17 will enter through the port 22, pass the valve 20, and enter the cylinder through the port 23, filling the annular space in the lower half of this cylinder between the heads 25 of the piston. From this space the air will pass through the port 48 to the under side of the valve piston 38 and thereby lift this valve, from the position it occupies in Fig. 14, to the upper limit of its movement. At the same time air will also pass through the port 23ᵃ into the supply pipe 47 and from the upper and lower ends of the latter through the ports 45 and 46 into the upper and lower ends of the upper and lower valve chests 32 and 33, respectively, thus causing the lower valve 35 to follow up the intermediate valve piston 38 and assume its uppermost position, while the upper valve 35 is forced up by the movement of the intermediate piston against the air pressure admitted to the upper valve chest 32 through the port 45. The air which has passed the throttle valve 20 will also force its way past the reducing valve 21 into the port 24, and thence to the supply pipe 26 and ports 52 and 53 into the valve chests 32 and 33. The immediately preceding upward movement of the valve 38, just referred to, will have left the port 53 in communication with the port 51, and the air from the pipe 26 will thus immediately enter beneath the lower head 25 of the main hammer piston through the port 51 and force the hammer up, while in the meantime the lifting of the valve will have uncovered the port 50 to the exhaust 55, thus leaving the air contained in the cylinder above the main piston free to escape as the hammer rises. After having thus been lifted, the hammer piston 2 and connected hammer peen will retain their raised positions, unless or until the selective valve is so adjusted as to bring one of the ports 56 into register with one of the ports 59. This adjustment will be brought about by the middle section 79 of the handle, by turning which the selective valve stem 63 and plug 57 can be turned to any one of the several positions of adjustment provided for by the engagement of the spring pawl 93 with the notches 92 on the collar 91 of said valve stem 63 (Fig. 13).

If the handle section 79 is turned so as to bring the spring pawl 93 into engagement with one of the end notches 92, none of the ports 56—59 will be in register and the hammer will remain inactive but in its raised position, as stated. If, however, the handle section 79 is turned so as to bring the spring pawl 93 into engagement with either of the intermediate notches 92, one or the other of the coöperating ports 56—59 will be brought into register and the high pressure air from the space between the heads of the hammer piston 2 will pass through this pair of ports into the center channel 60 of the valve plug 57, and thence through the radial port 61 and annular port 62 into the port 49 which leads to the upper end of the intermediate valve cylinder 34. The pressure of the air thus admitted will be higher than the pressure of air admitted to the lower end of this valve cylinder through the port 48, since the latter air will be that which comes through the reducing valve by way of the supply pipe 26 and ports 53 and 51, and consequently will suffice to drive the intermediate piston 38 down, driving the lower valve piston 35 down before it against the constant pressure admitted to the lower end of the lower valve chest 33 through the port 46, and thus shutting off the port 51 from communication with the supply port 53 and simultaneously opening said port 51 to the exhaust 54. At the same time the constant pressure admitted to the upper end of the valve 36, through the port 45, will force the upper valve piston 35 to follow down with the intermediate valve piston 38 and cut off the port 50 from communication with the exhaust port 55 and open it to communication with the supply port 52. Whereupon air from the supply pipe 26 will pass through into the upper end of the hammer cylinder 1 and force the hammer piston 2 down, the air beneath the piston in the meantime exhausting through the ports 51—54. The reciprocation of the hammer will now take place automatically as long as the valve 20 is open and the selective valve adjusted so that any pair of ports 56—59 is in register. The length of the stroke will, however, depend on which pair of ports 56—59 it is that is in register, and this will be determined by the rotary adjustment of the selective valve plug through the middle handle section 79, the spring pawl 93 serving to temporarily retain any adjustment which is once accomplished, while yielding to permit any other adjustment to be brought about as desired. The number of reciprocations of the hammer per minute can be regulated by adjusting the valve 53ª, and since this will only vary the velocity of the up or return stroke, it will not change the weight or force of the blow, which, however, can be regulated at will by varying the length of the stroke by means of the selective valve and by varying the effective pressure by means of the throttle valve.

The hammer may be stopped at any time by turning the inner handle section 78 so as to close the throttle, or by turning the middle handle section 79 so as to rotate the selective valve plug into an extreme position in either direction, in which case registration of the ports 56—59 will be cut off and the movement of the hammer will be stopped when it reaches its next uppermost position, the hammer remaining then in this raised position until started in motion again by further adjustment of the selective valve or until the air supply is cut off by closing the throttle valve 20.

While the hammer is reciprocating, the entire mechanism may be swung pivotally about the universal joint from which it is suspended from the ceiling, and in this manner the hammer peen may be brought to bear above any point on the anvil desired. This swinging movement can be readily accomplished by the grip of one hand of the operator upon the handle H which controls the movement of the hammer, and, owing to the great length of the suspension provided, the extreme swinging movement of the mechanism necessary to cover the entire anvil will not deflect the hammer materially from its normal vertical position. The other hand of the operator may and ordinarily will be used in manipulating the work on the anvil beneath the hammer. While the hammer is reciprocating, also, its peen 4 may be rotated to any desired position of angular adjustment without in any way interfering with the reciprocating action, by turning the end section 80 of the handle which will thereupon act through the shaft 94 and the gears 97 and 98 to turn the shaft 99. And the turning of this shaft will operate through the gears 103, 104 and 105 to rotate the stem 10 and thereby the hammer piston, piston rod and peen, this rotation taking place without interference with the reciprocatory movement of the hammer by reason of the sliding engagement of the stem 10 with the gear 105 and its sleeve 106.

When for any reason it is desired that the hammer mechanism shall be raised to clear the anvil, the operator touches the button 155 and thereupon energizes the electromagnet 148. This causes the armature 152 to be drawn in against the pole of the magnet 148 and moves the valve 135 to the left, thus opening the port 140 to the air admitted through the inlet pipe 138 and port 139, and permitting this air to pass through the inlet port 141 and past the check valve 144 into the lower end of the hoist cylinder 128, whereupon the piston 129 will be forced up, carrying with it the entire hammer mechanism, while the air above the piston escapes through the exhaust port 123ª until the upper end of the piston reaches this port and has its further movement cushioned by the air confined in the dashpot space above. If, prior to this lifting of the hammer mechanism by the hoist, the reciprocation of the hammer has not been stopped by the closing of the throttle 20 or by the adjustment of the selective valve 57 into an extreme position, it will now be automatically cut off by the longitudinal movement of the selective valve plug 57 brought about by the action of the spring 74. For as soon as the yoke 14 of the hammer cylinder is raised clear of the shoulders 16 of the guide rods 15, by the lifting action of the hoisting device, this spring will pull the rod 71 downward, bringing with it the lever 68 and stem 66, the head 65 of which is swiveled to the upper end of the selective valve plug. This movement cuts off the ports 56—59 from any possibility of registration with each other and thus by preventing any air from entering the port 49 causes the valve mechanism and consequently the hammer piston to stop at the upper limit of their movements. Such automatic cut off equally prevents the hammer from being started, while lifted above the anvil, by any accidental opening of the throttle or rotary adjustment of the selective valve, and consequently protects the hammer piston from violent contact with the lower cylinder head, such contact being imposible when the hammer is lowered by reason of the previous contact of the hammer peen with the anvil. When the hammer is lowered again by the hoist, the head 65 of the rod 71 will be pushed up into the yoke 14 again by the subjacent shoulder 16 of the guide rod 15 on that side, as the yokes come to rest upon these shoulders 16, and thereupon the rod 71 will swing the lever 68 up and lift the selective valve plug 57 through the stem 66 until the corresponding ports 56—59 are at the same level and in position for registration when the rotary adjustment of the valve plug is suitable. And thereupon, if this rotary adjustment has previously been such as to bring about such registration of any pair of ports 56—59, and if the throttle is still open, the hammer will automatically start again. Otherwise the hammer will begin to reciprocate as soon as the throttle is opened, and the valve plug is adjusted to bring one of the pairs of ports 56—59 into registration.

I claim as my invention:—

1. In a machine of the class described, a pivotally suspended fluid pressure hammer mechanism, comprising a cylinder and a reciprocating piston to which the hammer peen is attached, valve mechanism controlling the fluid pressure in the cylinder, means for rotating the hammer peen relatively to the cylinder during reciprocation, and a handle secured to the cylinder and operatively connected to the valve mechanism and peen rotating means, substantially as and for the purpose set forth.

2. In a machine of the class described, a pivotally suspended fluid pressure hammer mechanism comprising a cylinder and a reciprocating piston to which the hammer peen is attached, a throttle valve controlling the admission of fluid pressure to the cylinder, a selective valve controlling the length of stroke of the hammer, means for rotating the hammer peen relatively to the cylinder during reciprocation and a handle secured to the cylinder and operatively connected to the throttle valve, the selective valve, and the peen rotating means, substantially as and for the purpose set forth.

3. In a machine of the class described a shiftable tool-holding mechanism comprising a reciprocating part adapted to carry the tool, mechanism controlling said reciprocating part, means for rotating said reciprocating tool holder during its reciprocation, and a handle secured to the tool-holding mechanism for shifting the same about and operatively connected to the controlling mechanism and to the tool-holder rotating means, whereby the reciprocation and rotation of the tool holding part may be independently controlled from said handle.

4. In a machine of the class described a suspended swinging tool-carrying mechanism comprising a reciprocating part adapted to carry the tool, mechanism controlling said reciprocating part, means for rotating said reciprocating tool holder during its reciprocation, and a handle secured to the tool-holding mechanism for bodily shifting the same and operatively connected to the controlling mechanism and to the tool-holder rotating means whereby the reciprocation and rotation of the tool-holding part may be controlled from said handle.

5. In a machine of the class described a suspended swinging tool-carrying mechanism comprising a reciprocating tool-carrying part, means for reciprocating said part, a handle connected to said mechanism for shifting the same bodily, and means connected to and adapted to be operated through said handle to control the force of the blow of the reciprocating tool-carrying part, the length of movement thereof, and for rotating said tool-carrying part during its reciprocation.

6. A fluid pressure hammer comprising a cylinder and a reciprocating piston to which the hammer peen is connected, valve mechanism controlling the fluid pressure in the cylinder, and means for supplying relatively high fluid pressure to operate the valve mechanism and a lower fluid pressure to reciprocate the piston, substantially as and for the purpose set forth.

7. A fluid pressure hammer comprising a cylinder and a reciprocating piston to which the hammer peen is connected, an automatic valve mechanism, a throttle valve through which fluid pressure is introduced to operate the valve mechanism and reciprocate the hammer, and a reduction valve for maintaining a relatively lower pressure of the hammer operating fluid, substantially as and for the purpose set forth.

8. In a fluid pressure hammer, a cylinder and a reciprocating piston to which the hammer peen is connected, an automatic valve mechanism distributing fluid pressure to the cylinder to reciprocate the piston, said automatic valve mechanism being operated by fluid pressure from the cylinder distributed by the piston movement, a selective valve in part controlling the distribution of air by the piston movement to the automatic valve and means for reducing the fluid pressure for operating the piston below the pressure which operates the automatic valve, substantially as and for the purpose set forth.

9. In a fluid pressure hammer, a cylinder and a reciprocating piston connected to the hammer peen, an automatic valve distributing fluid pressure to reciprocate the piston, said automatic valve being operated by fluid pressure from the cylinder distributed by the piston movement, a selective valve controlling in part the distribution of fluid pressure by the piston movement to the automatic valve mechanism, a throttle valve through which the fluid pressure is supplied, and a reduction valve for relatively lowering the pressure which acts upon the hammer piston, substantially as and for the purpose set forth.

10. A fluid pressure hammer comprising a stationary cylinder and piston, a peen attached to one end of the piston, a rod projecting out of the cylinder from the other end of the piston, and a manually-controlled gearing on the cylinder engaging said rod to rotate the piston and peen at will varying distances in either direction relatively to the cylinder and without interfering with the reciprocatory movement, substantially as and for the purpose set forth.

11. A fluid pressure hammer comprising a stationary cylinder and piston, a peen attached to one end of the piston, a stem projecting out of the cylinder from the other end of the piston, and a manually-controlled gearing on the cylinder applied to said stem to rotate the piston and peen at will varying distances in either direction relatively to the cylinder without interfering with their reciprocation, said gearing including a pinion having a sliding engagement with the stem but non-rotatable with respect thereto, substantially as and for the purpose set forth.

12. A fluid pressure hammer comprising a cylinder and reciprocating piston, a peen attached to the piston, a gearing for rotating the hammer peen independently of the cylinder while the hammer is reciprocating, a valve mechanism controlling the fluid pressure in the hammer, and a handle having independent operative connection to the peen rotating gearing and valve mechanism, substantially as and for the purpose set forth.

13. In a machine of the class described, a pivotally suspended fluid pressure hammer mechanism, comprising a cylinder and a reciprocating piston to which the hammer peen is attached, means for rotatively adjusting the peen axially with respect to the cylinder while the hammer is reciprocating, and a handle secured to the cylinder and operatively connected to said peen adjusting means, substantially as and for the purpose set forth.

14. In a machine of the class described, a suspended fluid pressure hammer mechanism, fluid pressure devices for lifting the hammer mechanism within its suspension devices, and an automatic cut-off valve operating to close the supply of fluid pressure to the hammer mechanism when the hoisting mechanism is brought into action, substantially as and for the purpose set forth.

15. In a machine of the class described, a suspended fluid pressure hammer mechanism, valve mechanism therefor including a cut-off selective valve rotatable to control the length of stroke of the hammer, fluid pressure devices for lifting the hammer mechanism within the suspending devices, and means for automatically moving the selective valve longitudinally to interrupt the fluid pressure to the hammer mechanism when said lifting devices are brought into action, substantially as and for the purpose set forth.

16. In a machine of the class described, a suspended fluid pressure hammer mechanism, valve mechanism therefor including a cut-off selective valve for controlling the length of stroke of the hammer, fluid pressure devices for lifting the hammer mechanism within its suspending devices, a rod normally held repressed by the suspending devices when the hammer mechanism is lowered but adapted to be projected automatically when the hammer mechanism is raised by the lifting devices, and connections between said rod and selective valve for moving the latter into inoperative position when the lifting devices are brought into action, substantially as and for the purpose set forth.

17. In a machine of the class described, a fluid pressure hammer mechanism, valve mechanism including a cut-off selective valve rotatable to control the length of stroke of the hammer, fluid pressure devices for lifting the hammer mechanism within its suspending devices, a rod normally held repressed when the hammer mechanism is lowered and adapted to be projected automatically when the hammer mechanism is raised by the lifting devices, and connections between said rod and selective valve for moving the latter longitudinally into inoperative position when the lifting devices are brought into action, substantially as and for the purpose set forth.

18. In a machine of the class described, a fluid pressure hammer mechanism, suspension devices by which the hammer mechanism is suspended from an overhead support, including depending rods between which the hammer mechanism is mounted to slide vertically, devices within the suspension devices for lifting the hammer mechanism between the depending rods, shoulders at the lower ends of the rods upon which the hammer mechanism rests when lowered, a rod engaging a shoulder surface and held repressed thereby when the hammer mechanism is lowered and arranged to be automatically projected when the hammer mechanism is raised by the lifting devices, and means connected with said rod to interrupt the fluid distribution to the hammer mechanism when the rod is projected as the lifting devices are brought into action, substantially as and for the purpose set forth.

19. A fluid pressure hammer comprising a cylinder, a reciprocating piston to which the hammer is connected, an automatic valve controlling the fluid pressure distribution to the cylinder and including a pair of piston valves and an intermediate valve actuating piston, means for applying yielding pressure to the ends of the valves tending to hold them against the intermediate valve piston, and means controlled by the movement of the hammer piston for admitting pressure to operate the valve actuating piston, substantially as and for the purpose set forth.

20. A fluid pressure hammer comprising a cylinder, a reciprocating piston to which the hammer peen is connected, an automatic valve controlling the distribution of fluid pressure to the cylinder and including a pair of piston valves and an intermediate valve actuating piston, means for applying fluid pressure to the remote ends of the piston valve to hold them yieldingly against the valve actuating piston, and means controlled by the movement of the hammer piston for admitting pressure to operate the valve actuating piston, substantially as and for the purpose set forth.

21. A fluid pressure hammer comprising a cylinder, a reciprocating piston to which the hammer peen is connected, an automatic valve controlling the distribution of fluid pressure to the cylinder including an actuating cylinder and piston, a port affording communication between the hammer and valve piston cylinders at one end, and ports affording communication between the hammer and valve actuating cylinders at the other end, the latter system of ports leading through an adjustable selective valve by which the point of communication between said system of ports and the hammer cylinder can be varied to vary the length of stroke of the hammer, substantially as and for the purpose set forth.

22. A fluid pressure hammer comprising a cylinder, a reciprocating piston to which the hammer peen is connected, and an automatic valve controlling the distribution of fluid pressure to the cylinder and including a pair of valves and an intermediate valve actuating piston located in line with each other, means for forcing the valves toward the intermediate piston, means controlled by the movement of the hammer piston for admitting pressure to actuate the valve actuating piston, and detached stems inserted between the valves and valve actuating pistons to transmit the movement of the piston to the valve, substantially as and for the purpose set forth.

23. In a fluid pressure hammer, a cylinder and a reciprocating piston to which the hammer peen is connected, a fluid actuated valve mechanism distributing fluid pressure to the cylinder to reciprocate the piston, a selective valve in part controlling the distribution of fluid pressure to the valve mechanism, means for adjusting said selective valve to vary the stroke of the hammer, and means for moving said selective valve into position to cut off the fluid pressure and stop the hammer, substantially as and for the purpose set forth.

24. In a fluid pressure hammer, a cylinder and a reciprocating piston to which the hammer peen is connected, a fluid actuated valve mechanism distributing fluid pressure to the cylinder to reciprocate the piston, a selective valve in part controlling the distribution of fluid pressure to the valve mechanism, means for adjusting said selective valve to vary the stroke of the hammer, means for moving said selective valve into position to cut off the fluid pressure and stop the hammer, and means for reducing the fluid pressure for actuating the hammer piston below the fluid pressure admitted through the selective valve to actuate the valve mechanism, substantially as and for the purpose set forth.

25. In a fluid pressure hammer, a cylinder and a reciprocating piston to which the hammer peen is connected, a fluid actuated valve mechanism distributing fluid pressure to the cylinder to reciprocate the piston, a selective valve in part controlling the distribution of fluid pressure to the automatic valve, means for adjusting said selective valve to vary the length of stroke of the hammer, suspension devices for the hammer mechanism, means for lifting the hammer mechanism within its suspension devices, and means for automatically moving said selective valve into position to cut off the air and stop the hammer when said lifting devices are brought into operation, substantially as and for the purpose set forth.

26. In a fluid pressure hammer, a cylinder and a reciprocating piston to which the hammer peen is connected, a fluid actuated valve mechanism distributing fluid pressure to the cylinder to reciprocate the piston, a selective valve in part controlling the distribution of fluid pressure to the automatic valve, means for adjusting said selective valve to vary the length of stroke of the hammer, suspension devices for the hammer mechanism, means for lifting the hammer mechanism within its suspension devices, means for automatically moving said selective valve into position to cut off the air and stop the hammer when said lifting devices are brought into operation, and means for reducing the fluid pressure admitted through the selective valve to actuate the valve mechanism, substantially as and for the purpose set forth.

27. In a fluid pressure hammer, a cylinder and a reciprocating piston to which the hammer peen is connected, a fluid actuated valve mechanism distributing fluid pressure to reciprocate the piston, a selective valve in part controlling the distribution of fluid pressure to the valve mechanism, means for varying the length of stroke of the hammer by rotating said selective valve into different positions of adjustment, means for lifting the hammer mechanism bodily, means for automatically moving the selective valve into inoperative position to stop the hammer when the lifting devices are brought into operation, substantially as and for the purpose set forth.

28. In a fluid pressure hammer, a cylinder and a reciprocating piston to which the hammer peen is connected, a fluid actuated valve mechanism distributing fluid pressure to reciprocate the piston, a selective valve in part controlling the distribution of fluid pressure to the valve mechanism, means for varying the length of stroke of the hammer by rotating said selective valve into different positions of adjustment, means for lifting the hammer mechanism bodily, means for automatically moving the selective valve into inoperative position to stop the hammer when the lifting devices are brought into operation, and means for reducing the fluid pressure for actuating the hammer piston below the fluid pressure admitted through the selective valve to actuate the valve mechanism, substantially as and for the purpose set forth.

29. A fluid pressure hammer comprising a cylinder, a reciprocating piston to which the hammer peen is connected, an automatic valve controlling the distribution of fluid pressure to the hammer cylinder and including a pair of valves and an intermediate valve actuating piston, a selective valve in part controlling the distribution of fluid pressure to operate the valve actuating piston, and means for adjusting said selective valve to vary the stroke of the hammer, substantially as and for the purpose set forth.

30. In a fluid pressure hammer, a cylinder, a reciprocating piston by which the hammer proper is actuated, a fluid actuated valve mechanism distributing fluid pressure to the cylinder to reciprocate the piston, a selective valve in part controlling the distribution of fluid pressure to the valve mechanism, means for adjusting said selective valve to vary the stroke of the hammer, and means for choking the admission of fluid pressure to retract the hammer, substantially as and for the purpose set forth.

31. A fluid pressure hammer comprising a cylinder, a reciprocating piston by which the hammer peen is actuated, an automatic valve controlling the distribution of fluid pressure to the hammer cylinder and including a pair of valves and an intermediate valve actuating piston, a selective valve in part controlling the distribution of fluid pressure to actuate the valve actuating piston, means for adjusting said selective valve to vary the stroke of the hammer, means moving said selective valve into inoperative position to stop the hammer, and means for reducing the pressure of the fluid which acts upon the hammer piston below the pressure of the fluid admitted through the selective valve to actuate the valve mechanism, substantially as and for the purpose set forth.

32. In a fluid pressure hammer, a cylinder, a reciprocating piston by which the hammer peen is actuated, valve mechanism for distributing fluid pressure to the cylinder to reciprocate the piston, including a selective valve, means for varying the adjustment of the selective valve to vary the length of stroke of the hammer, and means for varying the number of strokes per minute without affecting the character of the hammer blow, substantially as and for the purpose set forth.

33. In a fluid pressure hammer, a cylinder, a reciprocating piston by which the hammer peen is actuated, means for distributing fluid pressure to the cylinder to project and retract the hammer, and means for choking the admission of pressure to retract the hammer without affecting the admission of pressure to project the hammer, substantially as and for the purpose set forth.

34. A machine of the class described comprising a fluid-pressure tool operating mechanism comprising a reciprocating part to which the tool may be attached, fluid-pressure means for operating said reciprocating part, a manually operable part connected to said mechanism, and means adapted to be independently operated through said manually operable part to control the force of the blow of the reciprocating tool-carrying part, to vary its length of stroke and to rotate it during its reciprocation.

35. A suspended fluid pressure hammer mechanism, means for lifting the hammer mechanism and an automatic cut-off valve operating to close the supply of fluid pressure to the hammer mechanism when the hoisting mechanism is operated.

36. A suspended fluid pressure hammer mechanism, a valve mechanism therefor including a selective valve rotatable to control the length of stroke of the hammer, means for lifting the hammer mechanism above its normal operative position, and means for automatically moving the selective valve longitudinally to interrupt the fluid pressure to the hammer mechanism when the said hammer mechanism is lifted.

37. A suspended fluid pressure hammer mechanism, valve mechanism therefor including a combined cut-off and selective valve for controlling the length of stroke of the hammer, means for lifting the hammer mechanism, a rod normally held repressed when the hammer mechanism is lowered, means to automatically project said rod when the hammer mechanism is raised and connections between said rod and the selective valve for moving the latter into inoperative position when the hammer mechanism is lifted.

38. A fluid pressure hammer mechanism, valve mechanism including a combined cut-off and selective valve rotatable to control the length of stroke of the hammer, means for lifting the hammer mechanism, a rod normally held repressed when the hammer mechanism is lowered to operative position, means to project said rod automatically when the hammer mechanism is lifted and connections between said rod and selective valve for moving the latter longitudinally into inoperative position when the hammer mechanism is raised.

39. A suspended fluid pressure hammer mechanism, a rod connected to said hammer mechanism, means to hold said rod repressed when the hammer mechanism is in its operative position, means to automatically move said rod when the hammer mechanism is raised above its operative position, and means connected with said rod to interrupt the fluid distribution to the hammer mechanism when the rod is moved and the hammer mechanism lifted above its operative position.

40. In an apparatus of the class set forth, a pivotally suspended fluid-pressure hammer mechanism, embodying a cylinder and a reciprocating piston to which the tool is attached, a selective valve controlling the length of stroke of the hammer, a handle attached to the cylinder whereby the hammer mechanism may be bodily shifted during operation, and means operatively connecting this handle to the selective valve.

41. In an apparatus of the class set forth, a reciprocating tool-holder and means for supporting and reciprocating the same, the supporting means being pivotally suspended, a handle attached to said supporting means for bodily shifting it about, means for rotating said tool during its reciprocation, and a rotative element on said handle operatively connected to said rotating mechanism, for the purpose set forth.

42. In an apparatus of the class set forth, a reciprocating tool-holder and means for supporting and reciprocating the same, the supporting means being pivotally suspended, a handle attached to said supporting means for bodily shifting it about, a stopping and starting means for said tool-reciprocating devices, and a rotative element on the handle operatively connected to said stopping and starting devices, for the purpose set forth.

43. In an apparatus of the class set forth, a reciprocating tool-holder and means for supporting and reciprocating the same, the supporting means being pivotally suspended, a handle attached to said supporting means for bodily shifting it about, devices for regulating the length of stroke of the tool and for rotating it during reciprocation and for stopping and starting it, and adjacent independently-rotative elements constituting the grasping portion of the handle and operatively connected to said devices, for the purpose set forth.

44. A fluid-pressure hammer comprising a cylinder and a reciprocating piston to which the tool is connected, valve mechanism controlling the fluid-pressure in the cylinder, and means for supplying fluid-pressure to operate the valve mechanism and the piston, said means embodying devices whereby the pressure of the fluid supplied to operate the piston is different from that supplied to the valve mechanism, for the purpose set forth.

45. In a machine of the class described, a suspended fluid pressure hammer mechanism, valve mechanism for controlling the stroke of the hammer, devices for lifting the hammer mechanism within its suspending devices, a rod normally held repressed by the suspending devices when the hammer mechanism is lowered but adapted to be projected automatically when the hammer mechanism is raised by the lifting devices, and connections between said rod and valve for moving the latter into inoperative position when the lifting devices are brought into action, substantially as and for the purpose set forth.

46. In a machine of the class described, a fluid pressure hammer mechanism, suspension devices by which the hammer mechanism is supported from above, and fluid pressure devices for lifting the hammer mechanism within its suspension devices, including a cylinder and a lifting piston connected with the hammer mechanism, an inlet port for admitting fluid pressure at the bottom of the cylinder, an exhaust port leading out of the lifting cylinder through a series of openings spaced at different distances from the bottom, and valve mechanism controlling the admission and exhaustion of fluid pressure through said inlet and exhaust ports, substantially as and for the purpose set forth.

47. In a machine of the class described, a fluid pressure hammer mechanism, suspension devices by which the hammer mechanism is supported from above, and fluid pressure devices for lifting the hammer mechanism within its suspension devices, including a cylinder and a lifting piston connected with the hammer mechanism, an inlet port leading into the lifting cylinder at its bottom, an exhaust port leading out of the lifting cylinder above its bottom, a port connected with both the inlet and exhaust ports, a valve controlling the admission and exhaustion of fluid pressure through the latter port, and check valves in the inlet and exhaust ports for determining the proper direction of flow therein, substantially as and for the purpose set forth.

48. In a machine of the class described, a fluid pressure hammer mechanism, and suspension devices for pivotally swinging said hammer mechanism from an overhead support, including a universal joint comprising a member pivotally suspended from the overhead support, and a member from which the hammer mechanism is suspended and which is pivotally secured to the first mentioned member on an axis, and means for adjusting said members relatively to each other to shift the center of gravity of the suspended mechanism with relation to the center of suspension, substantially as and for the purpose set forth.

49. In a machine of the class described, a fluid pressure hammer mechanism and suspension devices for pivotally swinging said hammer mechanism from an overhead support comprising an outer annular member pivotally suspended from the overhead support, and an inner member adjustably pivoted to the outer member, substantially as and for the purpose set forth.

50. In combination, a pivotally suspended frame, a tool-carrier and a motor on the frame for reciprocating the same, means for rotarily adjusting the tool-carrier independently of the frame, a hand-hold attached to the frame and operatively connected to said adjusting means.

51. A pivotally suspended frame, a tool-carrier depending therefrom, a motor for reciprocating the tool-holder, means controlling the length of stroke of the tool-carrier, and a hand-hold attached to the frame and operatively connected to said controlling means.

In testimony, that I claim the foregoing as my invention, I affix my signature in presence of two subscribing witnesses, this 5th day of July, A. D. 1906.

LESLIE E. HOWARD.

Witnesses:
K. A. COSTELLO,
HENRY W. CARTER.